MULTIPLE STAGE EXTENSIBLE BOOM

Original Filed Nov. 12, 1968 2 Sheets-Sheet 1

INVENTORS
ERICH W. LOEFFLER
HANS KRUGER
BY Julian Caplan
ATTORNEYS

MULTIPLE STAGE EXTENSIBLE BOOM

Original Filed Nov. 12, 1968 2 Sheets-Sheet 2

INVENTORS
ERICH W. LOEFFLER
HANS KRUGER
BY Julian Caplan
ATTORNEY

United States Patent Office

Re. 28,041
Reissued June 11, 1974

28,041

MULTIPLE STAGE EXTENSIBLE BOOM

Erich W. Loffler and Hans Kruger, Redwood City, Calif., assignors to Electro-Motion Pacific, Inc., Redwood City, Calif.

Original No. 3,586,270, dated June 22, 1971, Ser. No. 774,850, Nov. 12, 1968. Application for reissue Nov. 2, 1972, Ser. No. 303,122

Int. Cl. F21p *5/00*

U.S. Cl. 240—3 6 Claims

Matter enclosed in heavy brackets [ ] appears in the original patent but forms no part of this reissue specification; matter printed in italics indicates the additions made by reissue.

ABSTRACT OF THE DISCLOSURE

An extensible boom for portable lights has a two-part base. One part of the base is fixed to a trailer or other vehicle and the other part is rotatable with respect thereto about a vertical axis. Hinged to the rotatable part about a horizontal axis is a telescopic multisection boom. A first winch elevates the boom from horizontal to vertical position. A second winch controls a cable system located inside the boom sections to elevate the boom. A manually extensible top boom section may be used to increase the maximum height.

This invention relates to a new and improved extensible boom for portable lights. More particularly the invention relates to a boom structure preferably trailer or other vehicle mounted, having a boom which is collapsible to horizontal position and erected to a vertical position. The boom has a plurality of telescopic sections and the uppermost section carries a frame on which a plurality of lights are mounted. Cables are reeved inside the boom sections, an end of one cable running to a winch used to extend these sections to the desired elevation.

One of the features of the invention is the fact that even after the boom is extended, the boom may be rotated about a vertical axis to direct the light through the desired area of illumination.

Still another feature of the invention is the fact that the reeving of the cables which elevate the boom sections makes for a rapid raising and lowering of the boom. Accordingly, in a preferred form of the invention a compound pulley system is employed between two of the boom sections so that there is a two-for-one boom motion with respect to the adjacent section. The reeving of the cables is such as to occupy a minimum of space in the interior of the section, making it possible to increase the number of sections per boom thickness.

Another feature of the invention is the fact that the boom sections are of square or noncircular cross section so that they do not turn relative to each other. This feature is of particular importance in assuring proper directional pointing of the lights. The use of sections which are nonrotatable relative to each other also prevents tangling of the cables in the interior.

Another feature of the invention is the facility with which the boom sections may be raised and lowered. Thus, the winch which is used to raise the boom is mounted on a permanent vertical section provided with a hinge which receives the foldable sections. When the foldable sections are erected they rest upon a base which provides a firm support against tilting.

Still another feature of the invention is the provision of an extensible boom section at the top which may be manually adjusted between collapsed and extended position prior to elevation of the boom. The use of such manually extensible sections reduces the number of movable sections required and thus reduces the number of cables required in the interior of the boom sections and hence makes possible a greater number of sections per boom width.

Other objects of the present invention will become apparent upon reading the following specification and referring to the accompanying drawings in which similar characters of reference represent corresponding parts in each of the several views.

Figure 2:
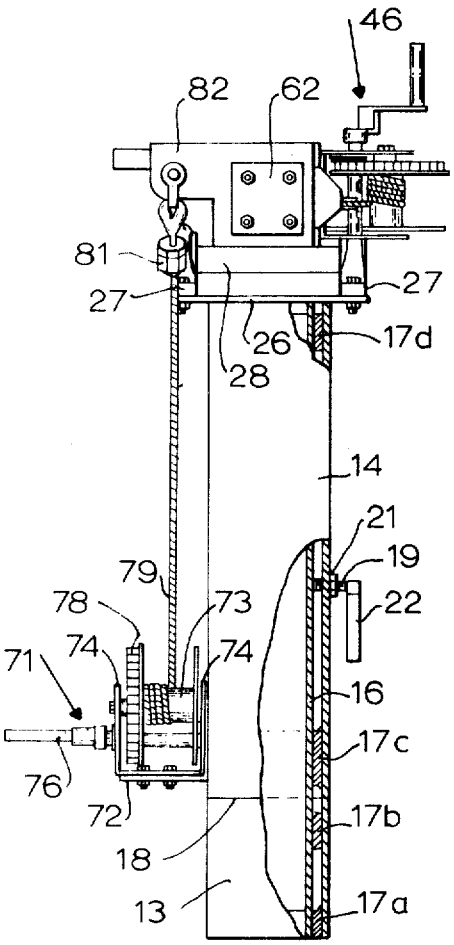
FIG. 2 is an enlarged rear elevational view of the boom in collapsed position.

Trailer 5 is provided with wheels 6 for ready transportation, it being understood that the boom hereinafter described may be mounted on other types of vehicles. In the trailer 5 illustrated herein, vertically adjustable legs 7 are provided to anchor the trailer in position. Trailer 5, in addition to the boom hereinafter described, carries a motor, a generator or other equipment designated generally by reference numeral 8 and subject to considerable variation. Adjacent to the front of the trailer is a stanchion 9 having a clevis 11 at its top to support the boom in its collapsed and lowered position indicated by dotted lines in FIG. 1. The rear of trailer 5 has a platform 12 which receives vertically disposed circular collar or first base section 13 which is welded to the trailer and provides the bearing for the entire boom structure. Above stationary collar 13 is a rotatable collar or second base section 14 which is aligned therewith. Collars 13, 14 meet about a horizontal joint 18. Interiorly of collars 13, 14 is a vertical lesser diameter sleeve 16. (See FIG. 2) Spacer collars 17a, 17b, 17c, 17d, are interposed between collars 13, 14 and sleeve 16 to space the latter centrally. Collars 17a, 17c, 17d are preferably welded to sleeves 13, 14, whereas spacer collar 17b is welded to sleeve 16. The foregoing arrangement makes it possible to rotate rotatable collar 14 relative to stationary collar 13. To lock the two members in position relative to each other, a screw 19 is threaded into nut 21 welded to the exterior of collar 14, the inner end of screw 19 bearing against sleeve 16. By turning external handle 22 on screw 19 member 14 may be secured against rotation relative to the sleeve 16 and sleeve 16 is, of course, secured against rotation relative to stationary collar 13.

Figure 4:
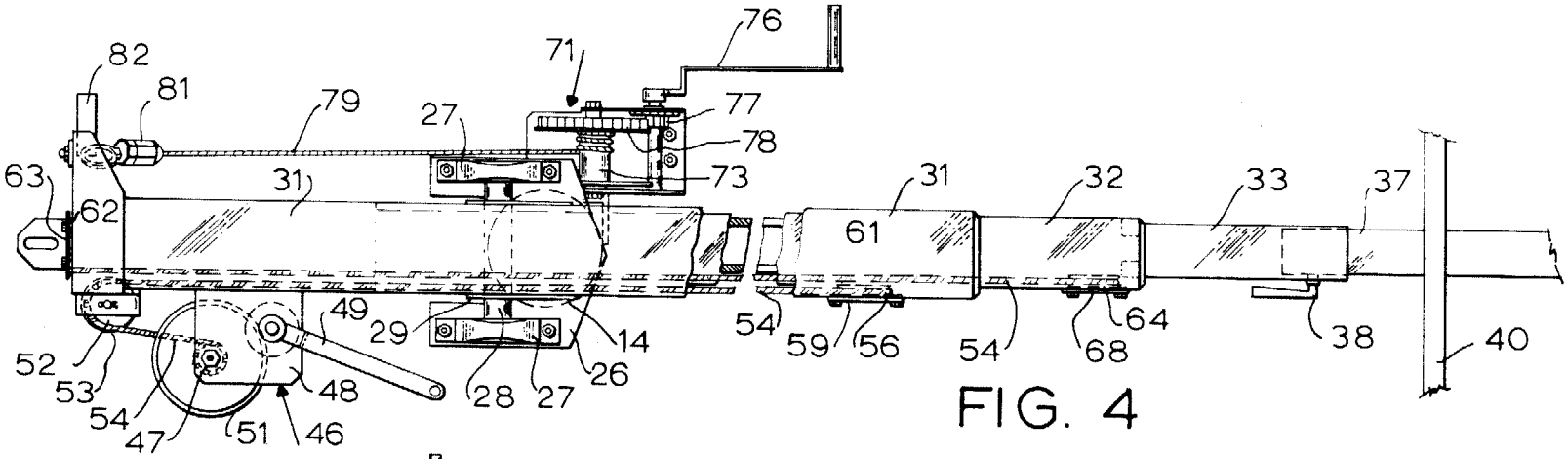
FIG. 4 is a side elevation thereof.
Figure 3:
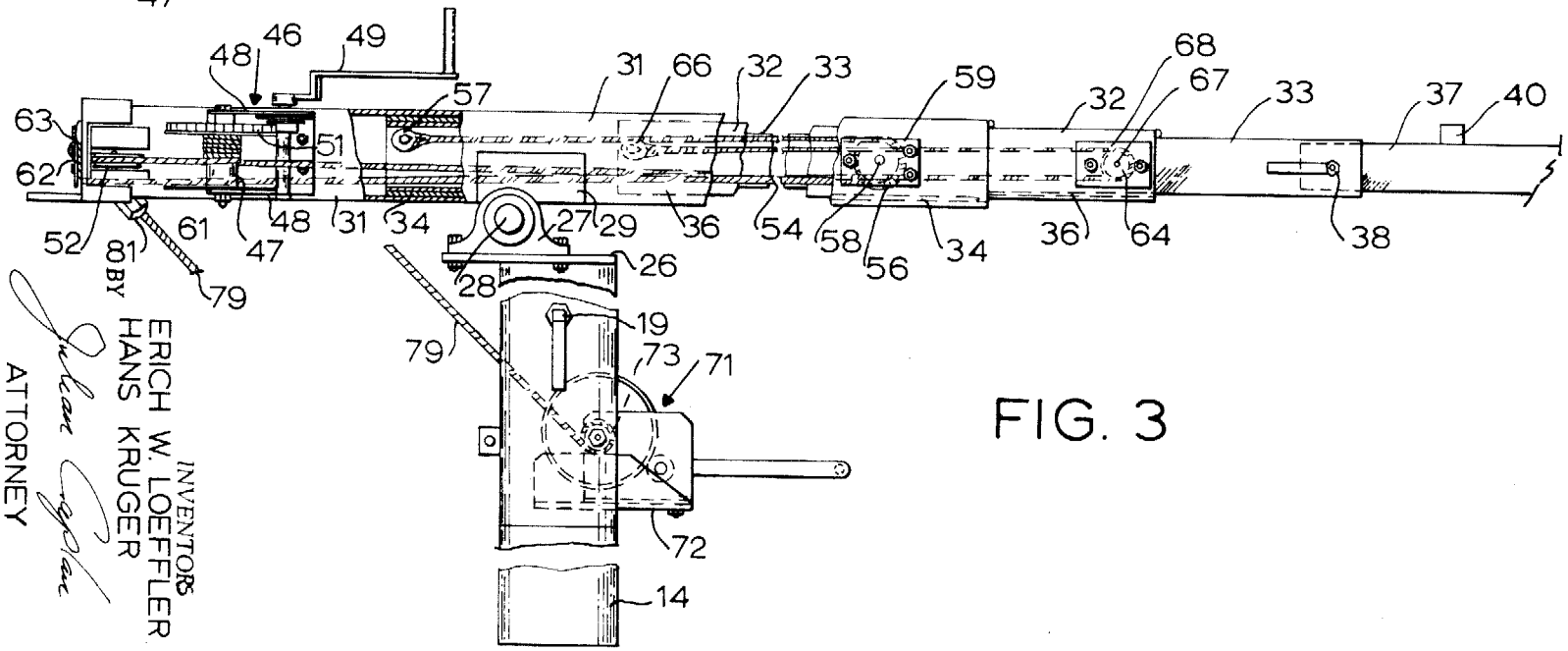
FIG. 3 is a top plan view of the boom.

Horizontal plate 26 is welded to the top of collar 14 and overhangs the same rearwardly. (See FIGS. 3 and 4) Pillow blocks 27 are mounted on plate 26 and receive horizontal shaft 28. Welded to shaft 28 is a channel member 29 which receives the lowermost and widest boom section 31. Inside boom section 31 are mechanically extensible boom sections 32, 33 of lesser cross section telescopically arranged. Preferably the sections 31, 32, 33 are of square cross section mechanical tubing. As is apparent from FIG. 3, the outside dimension of section 32 is less than the inside dimension of tube 31. In order to provide for smooth sliding and accurate centering of the tubes, at intervals slide rods 34 are secured to the inside corners of tube 32. Similar rods 36 are located at the corners of tube 33 and provide a bearing for tube 33 relative to tube 32. The rods 34, 36 determine spaces for various cables as hereinafter described.

Optionally, the outermost mechanically actuated section 33 is provided with a manual extension 37 which fits into the outer open end of section 33. Extension 37 moves into and out of section 33 and is adjustably held in position by latch 38 which is similar in design and function to the latch 19 heretofore described. Mounted on extension 37 is a metal frame 40 on which is a plurality of reflectors 39 and lights 41. Where the extension 37 is not used the frame 40 is mounted on the outer end of section 33. Section 31 is approximately evenly balanced with respect to channel 29.

Adjacent to the bottom end of channel 31 (the rearward end in the collapsed position of the boom) is a winch 46. Winch 46 has a cable drum 47 rotatively mounted inside plates 48 and turned from handle 49 by a series of gears 51. At the rear end of section 31 is a bracket 52 in which a pulley 53 is rotatively mounted. Cable 54 runs around drum 47, thence under pulley 53 and into an opening in section 31 and thence internally of section 31 around a pulley 56 mounted on the inside of the outer end of section 31. From pulley 56 the cable 54 runs back to an anchor 57 on the inner end of section 32. The pulley 56 is mounted on a shaft 58 which is mounted on a plate 59 which closes off an opening in the side of section 31. Thus when winch 46 is wound, section 32 is extended relative to section 31. For each inch which the cable 54 is drawn in, the section 32 is etxended 1 inch. A second cable 61 extends externally of the lower end of section 31 and is formed in a loop 62 which is secured in place by plate 63 fixed to the end of section 31. Cable 61 runs up through the inside of section 32 to a pulley 64 at the remote end of section 32 and thence back to an anchor 66 in the lower end of section 33. Pulley 64 is supported on shaft 67 mounted on a plate 68 which closes off an opening in the side of section 32. The reeving of cables 54 and 61 is such that section 33 is extended 1 inch for each 1 inch of extension of section 32 and hence 2 inches for every inch of winding of cable 54 on winch 46.

To erect the boom, a second winch 71 is used. Winch 71 is mounted on a bracket 72 attached to collar 14. Winch drum 73 is supported between sideplae 74 mounted on bracket 72 and has a winding handle 76 which carries gear 77 meshing with gear 78 on drum 73. Cable 79 passes around drum 73 and extends to a fitting 81 connected to an extension 82 on the end of section 31. By winding handle 76, the bottom end of section 31 is pulled downwardly, shaft 28 rotating in hollow blocks 27.

Figure 1:
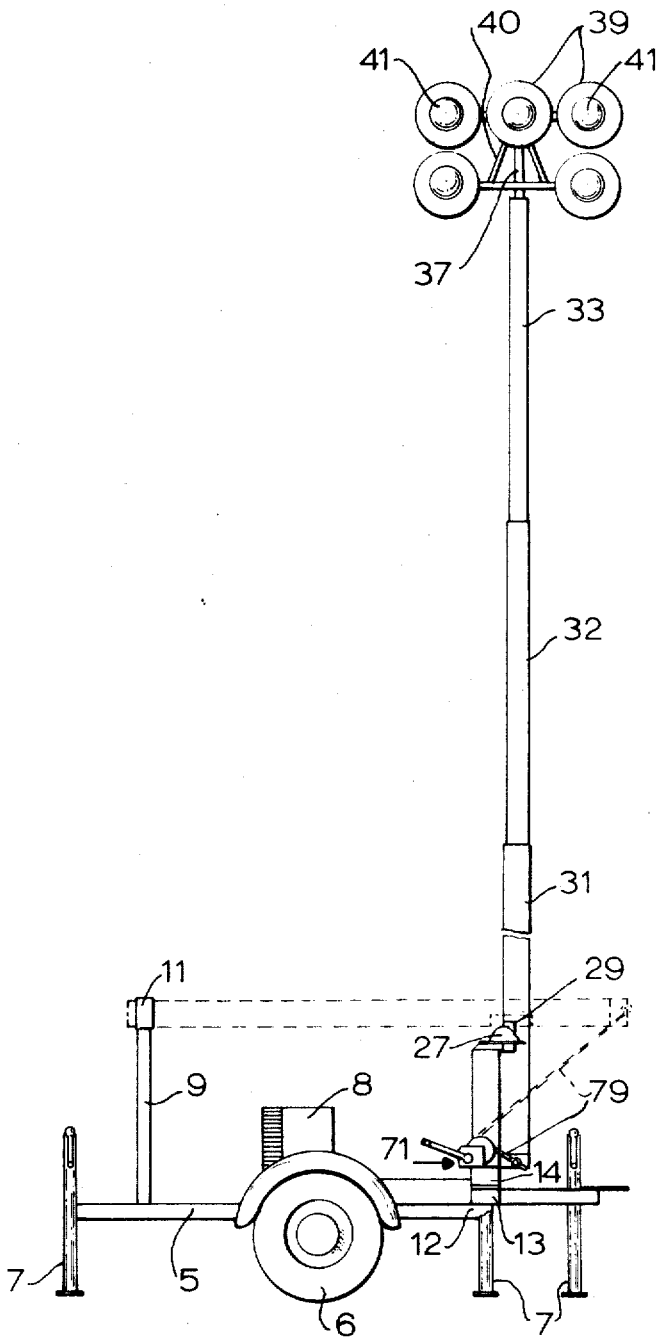
FIG. 1 is a side elevational view of a trailer on which the boom is mounted showing the boom erect in solid lines and collapsed in dotted lines.

In use, where extension 37 is used the section 37 is extended with the boom in lowered position shown in dotted lines in FIG. 1 and when fully extended the latch 38 is engaged. Thereupon the winch 71 is turned pulling the boom to erect position, shaft 28 turning in pillow blocks 27. Thereupon winch 46 is turned causing the section 32 and 33 to be projected until the lights 41 are at the desired height. The turning of winch 46 causes cable 54 to pull anchor 57 toward the outer end of section 31 thereby elevating section 32. Simultaneously, cable 61 which is anchored to the end of boom 31 is extended by reason of movement of its pulley 64 and this causes anchor 66 to more the boom 33 to extended position. When the boom is properly extended, latch 19 is relaxed permitting collar 14 to turn relative to collar 13 until the lights 41 are directed properly. Thereupon the latch 19 is engaged and the boom is retained in such position so long as the conditions requiring illumination continue. When it is desired to retract the boom the cycle of operations is reversed.

What we claim is:

1. An extensible boom for portable lights comprising a vehicle, a first base section mounted on said vehicle, a second base section, means mounting said base sections together for rotation of said second base section relative to said first base section about a vertical axis through substantially 360°, a hollow first boom section, means mounting said first boom section on said second base section for pivotal movement between a horizontal collapsed position and a vertical erect position, first winch means on said second base section for moving said first boom section between collapsed and erect positions, a second boom section telescopically movable within said first boom section between retracted and extended positions, second winch means on said first boom section for moving said second boom section between retracted and extended positions, and lights mounted on the outer end of the outermost of said boom sections.

2. An extensible boom according to claim 1 in which said second winch is provided with a cable, said cable reeved extending from said second winch up inside said first boom section around a pulley fixed to the inside of the outer end of said first boom section and thence back to an anchor on the lower end of said second boom section.

3. An extensible boom according to claim 2 which further comprises a third boom section telescopically movable within said second boom section, a second cable fixed to said first boom section, a second pulley fixed to the inside of the outer end of said second boom section, said second cable running around said second pulley and thence back to a second anchor on the lower end of said third boom section.

4. An extensible boom according to claim 3 which further comprises a fourth boom section on which said lights are mounted, said fourth boom section being telescopically movable in said third boom section and manually movable between retracted and extended positions, latch means securing said fourth boom relative to said third boom, and each of said boom sections having noncircular tubular members which are nonrotatable relative to each other.

*5. An extensible boom for portable lights comprising a base, a hollow first boom section mounted on said base, a hollow second boom section telescopically movable with said first boom section, between retracted and extended positions, a third boom section telescopically movable within said second boom section, winch means on said first boom section, a first cable reeved extending from said winch means up inside said first boom section around a first pulley fixed to the inside of the outer end of said first boom section and thence back to a first anchor on the lower end of said second boom section, a second cable fixed to said first boom section, a second pulley fixed to the inside of the outer end of said second boom section, said second cable running around said second pulley and then back to a second anchor on the lower end of said third boom section, whereby on operating said winch means, in one direction with said sections collapsed causes said first cable to pull said first anchor toward the upper end of said first section thereby elevating said second section and simultaneously causing said second cable to be extended and to move said third section toward the upper end of said second section, and lights mounted on the outer end of the outermost of said boom sections.*

*6. A boom according to claim 5 which further comprises a fourth boom section telescopically movable in said*

*third boom section and manually movable between retracted and extended positions.*

References Cited

The following references, cited by the Examiner, are of record in the patented file of this patent or the original patent.

UNITED STATES PATENTS

| | | | |
|---|---|---|---|
| 2,899,540 | 8/1959 | Allmand et al. | 240—3 |
| 3,381,118 | 4/1968 | Widner | 240—3 |

| | | | |
|---|---|---|---|
| 3,463,916 | 8/1969 | De Bella | 240—3 |
| 3,495,364 | 2/1970 | De Bella | 240—3 |

FOREIGN PATENTS

| | | | |
|---|---|---|---|
| 460,176 | 9/1968 | Switzerland | 240—3 |
| 440,183 | 1/1968 | Switzerland | 240—3 |

RICHARD L. MOSES, Primary Examiner

U.S. Cl. X.R.

240—36, 67